United States Patent

Kautsch

[11] Patent Number: 5,855,421
[45] Date of Patent: Jan. 5, 1999

[54] TRACK ROLLER FRAME WITH INSIDE REACTION ARM

[75] Inventor: Dewaine A. Kautsch, Dekalb, Ill.

[73] Assignee: Caterpillar Inc., Peoria, Ill.

[21] Appl. No.: 763,489

[22] Filed: Dec. 11, 1996

[51] Int. Cl.[6] .................................................. B62D 55/10
[52] U.S. Cl. .......................................... 305/136; 305/138
[58] Field of Search .................................. 305/136, 138,
305/193, 195, 199, 124, 125, 128, 129,
130, 131, 132, 133, 134, 142; 180/9.1;
403/365, 371, 373, 374, 370

[56] References Cited

U.S. PATENT DOCUMENTS

| | | | |
|---|---|---|---|
| 1,401,625 | 12/1921 | Mader . | |
| 2,587,813 | 3/1952 | Bombardier | 305/8 |
| 2,843,431 | 7/1958 | Beaufort | 305/9 |
| 3,358,634 | 12/1967 | Pratt | 115/1 |
| 3,375,944 | 4/1968 | Bexten | 214/140 |
| 4,516,649 | 5/1985 | Braathen | 180/9.1 |
| 4,826,260 | 5/1989 | Plourde | 305/16 |
| 4,834,478 | 5/1989 | Stevens et al. | 305/138 X |
| 4,836,318 | 6/1989 | Tonsor et al. | 305/136 X |
| 4,893,687 | 1/1990 | Simmons | 305/138 X |
| 4,923,257 | 5/1990 | Purcell | 305/29 |
| 4,949,800 | 8/1990 | Virly | 180/9.21 |
| 5,312,176 | 5/1994 | Crabb | 305/138 X |
| 5,368,115 | 11/1994 | Crabb | 305/136 X |
| 5,373,909 | 12/1994 | Dow et al. | 180/9.1 |
| 5,452,949 | 9/1995 | Kelderman | 105/24 |

FOREIGN PATENT DOCUMENTS 413415   5/1925   Germany .

Primary Examiner—Russell D. Stormer
Attorney, Agent, or Firm—Larry G. Cain

[57] ABSTRACT

Present reaction arms for use with an endless belt fail to adequately disperse the debris from the drive wheel and the endless belt. The present reaction arm includes a cushioning member interposed a first end and an outer surface of a center portion of a hub assembly. And, the reaction arm includes a second end being attached to a chassis of a work machine. The reaction arm is axially positioned within a pair of sides of an endless belt and is generally centered along an axis defined by the pair of sides.

16 Claims, 3 Drawing Sheets

TRACK ROLLER FRAME WITH INSIDE REACTION ARM

TECHNICAL FIELD

This invention relates generally to a roller frame assembly for a rubber belted work machine and more particularly to a support system including an inside reaction arm.

BACKGROUND ART

Present day systems utilize a propulsion system in which a continuous rubber belt is entrained about a pair of wheels. Problems encountered in actually reducing such belt system to practice include how to drive such belt with the entrained wheels, how to maintain structural integrity of the belt and wheels, how to entrain the belt in lateral alignment with the wheels when the wheels are subject to large lateral loads, how to provide long life for the belt and wheels, and how to accommodate debris ingested between the wheels and belt while maintaining the driving relationship therebetween without damaging either.

In operation, the work machines with rubber belts are used to extend the operating season, versatility of the work machine and reduce soil compaction. For example, in wet conditions, as the work machines are operated mud and other debris is collected or deposited along the inner surface of the belts. As the belts are driven and rotate debris is carried along to the inner surface of the belt to the interface of the belt and the drive wheel. The debris is at least partially removed from the interface as the drive wheel interfaces with the belt. As a generality, experience has shown that an effective manner to remove the debris from the interface of the drive wheel and the belt is to cause the debris to pass from the center of the drive wheel and the belt outwardly to the edge of the drive wheel and the belt. Thus, if the roller frame assembly which supports the belt is attached to the drive axle externally of the drive wheel and/or of the rubber belt debris can buildup on the support or catch along the structure of past attachment systems rather than being expelled from the interface.

Additionally, with present systems of attaching the roller frame assembly to the support when changing the gage of the work machine the tension system must be relieved, the gage changed and the tension system reapplied.

The present invention is directed to overcome one or more of the problems as set forth above.

DISCLOSURE OF THE INVENTION

In one aspect of the invention a work machine comprises a chassis, an engine having a transmission and a final drive operatively connected and attached to the chassis. A pair of endless belts are positioned on each of a side of the work machine and is operatively driven by the engine, transmission and final drive. The pair of endless belts define an inner surface and a pair of sides. A pair of drive wheels are drivingly and axially movably attached to the final drive on each of the sides of the work vehicle. Each of the drive wheels has a hub assembly which define a pair of driving disks being space apart and form a cavity being generally centered about the hub assembly. A pair of support assemblies each have a first end attached to the corresponding hub assembly and a second end attached to the chassis. The first end of the support assembly is positioned between the pair of sides of individual ones of the pair of endless belts.

In another aspect of the invention a system for attaching an endless belt to a work vehicle is claimed. The endless belt includes a pair of sides and an inner surface being defined between the pair of sides. The work vehicle includes a chassis and a driving apparatus operatively attached to the chassis. The system comprises a hub assembly having a driving disk operatively attached to the driving apparatus and being spaced from the chassis. The driving disk includes a pair of driving portions being separated by a preestablished space. A support assembly has a first end being attached to the hub assembly and a second end being attached to the chassis. The first end of the support assembly is positioned within the preestablished space and within the pair of sides of the endless belt.

BEST MODE FOR CARRYING OUT THE INVENTION

Figure 1:
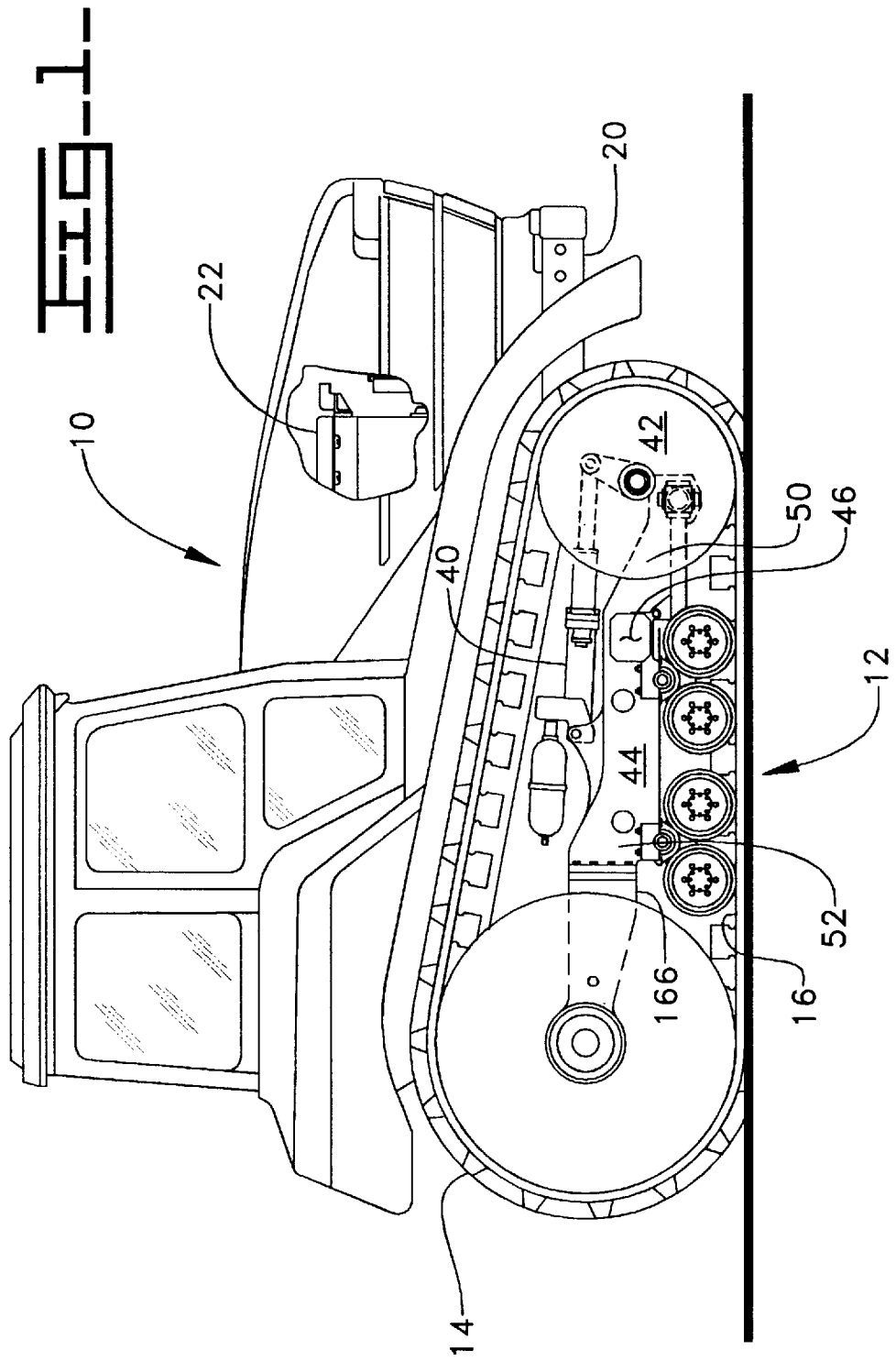
FIG. 1 is a side elevational view of the work machine embodying the present invention.

Referring to FIG. 1, a work machine 10 is shown having a rubber belted track system 12. The rubber belted track system 12 utilizes a pair of endless belts 14 being positioned on each side of the work machine 10. Each of the pair of endless belts 14 defines an inner surface 16 extending along the circumference positioned between a pair of sides 18 having an axis 19 generally centered between the pair of sides 18. The work machine 10 includes a chassis 20, an engine 22, a transmission, not shown, and a final drive 26 for driving the rubber belted track system 12 in a conventional manner. As an alternative, the conventional system could be of any scope such as a manual drive system, hydrostatic drive system or power shift system.

In this application, each of the endless belts 14 is frictionally driven by a drive wheel 28 being powered by the engine 22 in a conventional manner. In as much as the pair of endless belts 14 are substantially structurally and operatively identical, further reference will be made to only a single side of the belted drive system 12. The endless belt 14 is tensioned on the drive wheel 28 by a conventional tensioning system 40 including an idler wheel 42 which is well known in the art. In this application, the drive wheel 28 is positioned near the back of the work machine 10 and the idler wheel 42 is positioned toward the front of the work machine 10. The idler wheel 42 and the drive wheel 28 are spaced by the tension system 40. In this application, the idler wheel 42 is attached to a roller frame assembly 44 which is attached to the chassis 20 at least partially in a conventional manner, such as by a hard bar 46. The roller frame assembly 44 is further attached the an axle 48 of the final drive 26. The roller frame 44 is movably attached to the hardbar 46 by a rigid connection.

Figure 2:
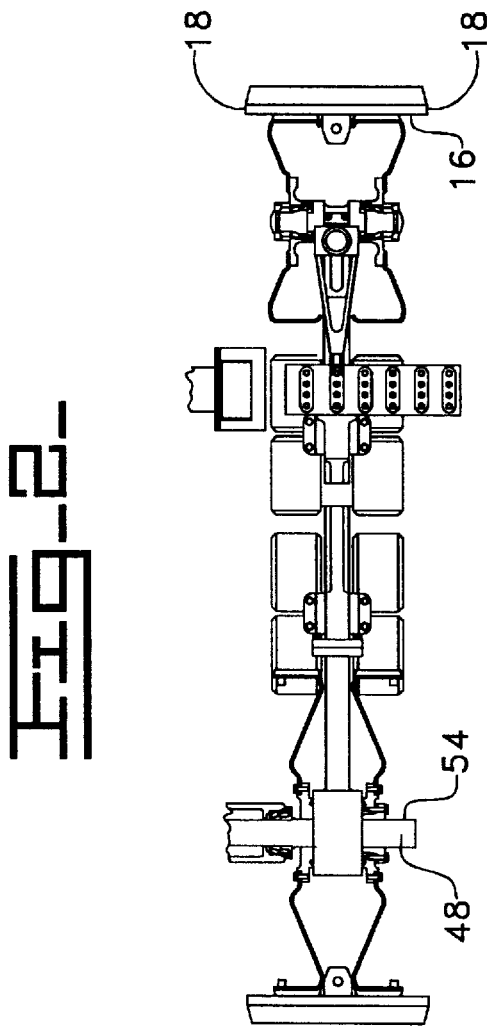
FIG. 2 is a sectional view of the roller frame and mounting system.
Figure 3:
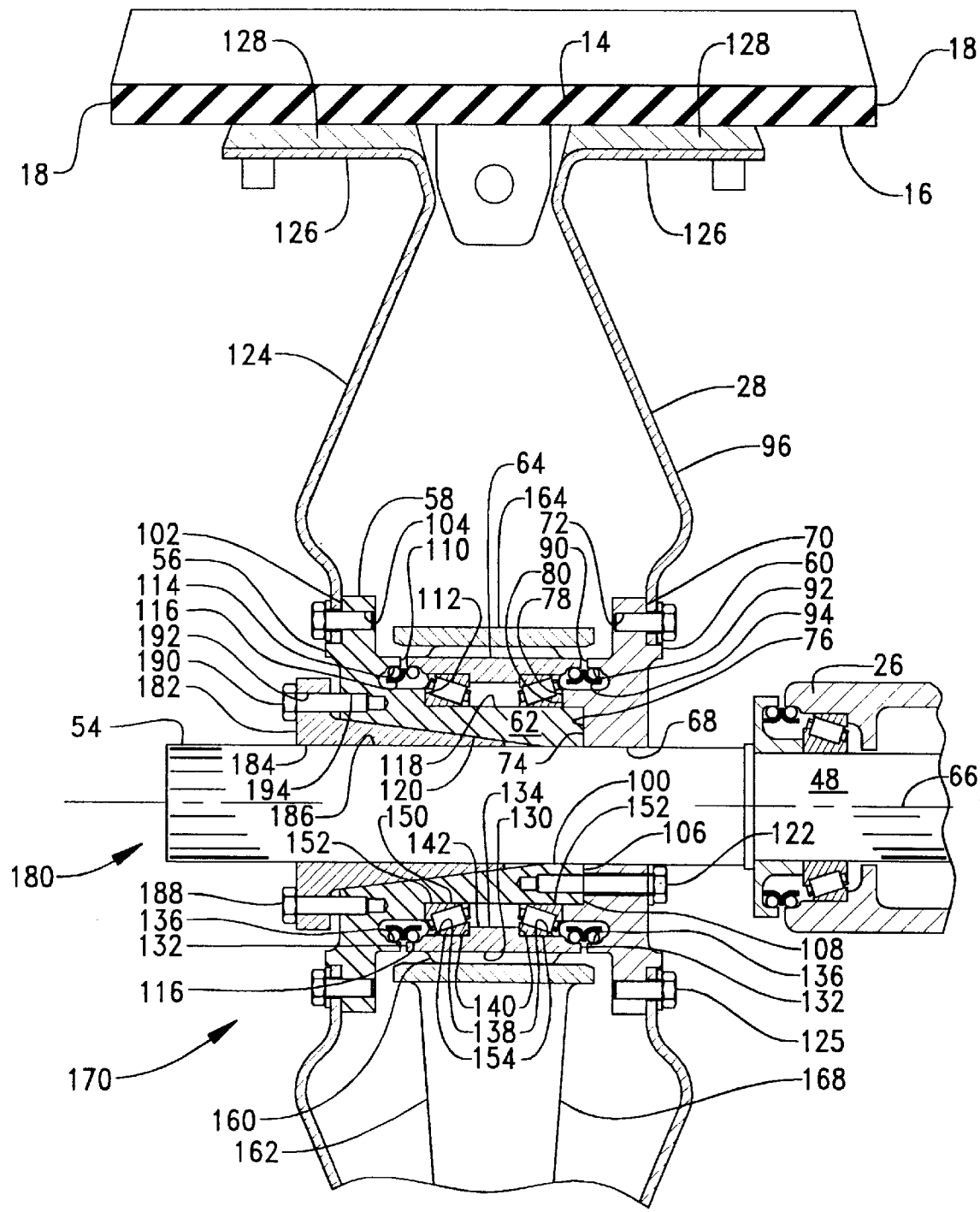
FIG. 3 is an enlarged sectional view of the interface between the roller frame and mounting system as taken along line 3—3 of FIG. 2.

As further shown in FIGS. 2 and 3, the roller frame assembly 44 includes a first end portion 50 near which is attached the hard bar 46 and a second end portion 52 being attached to the axle 48 in a manner by which the axle 48 rotates relative to the roller frame assembly 44 as will be explained later. In this application, the axle 48 includes an end portion 54 extending outwardly of the chassis 20 of the work machine 10. A hub assembly 56 is drivingly and axially movably connected to the axle 48 in a conventional manner. For example, the hub assembly 56, in this application is made of a multipiece assembly, includes a three piece base 58 defining an inside or first portion 60, an outside or second portion 62 and a center or third portion 64. The inside portion 60 has a generally cylindrical configuration defining an axis 66. The inside portion 60 has a bore 68 extending therethrough and being centered on the axis 66. A first side portion 70 of the inside portion 60 is positioned adjacent the chassis 20 and has a plurality of threaded holes 72 positioned therein being radially spaced about the axis 66, a second side portion 74 is spaced from the first side portion 70 and defines an abutting surface 76 radially extending from the bore 68. A first protrusion 78 extends from the second side portion 74 and defined an abutting surface 80 and a second protrusion 90 extends from the second side portion 74. Interposed the first protrusion 78 and the second protrusion 90 is a sealing surface 92 having a seal member 94 positioned in sealing relationship thereto. Extending radially outward and attached to the first side portion 70 of the inside portion 60 is a driving disk 96 which makes up a portion of the drive wheel 28.

The outside portion 62 has a generally cylindrical configuration being centered about the axis 66. The outside portion 62 has a bore 100 extending therethrough being generally sized to that of the bore 68 in the inside portion 60 and is coaxial therewith. A first side portion 102 of the outside portion 62 is positioned away from the chassis 20 and has a plurality of threaded holes 104 positioned therein being coaxial with the plurality of threaded holes 72 in the inside portion 60 and is radially spaced about the axis 66. A second side portion 106 of the outside portion 62 is spaced from the first side portion 102 and defines a first abutting surface 108 radially extending from the bore 100. A protrusion 110 extends from the second side portion 74. Interposed the first abutting surface 108 and the protrusion 110 is a second abutting surface 112. And, positioned radially between the second abutting surface 112 and the protrusion 110 is a sealing surface 114 having a sealing member 116 in sealing relationship thereto. Interposed the first abutting surface 108 and the second abutting surface 112 is a bearing surface 118. A frustoconical bore 120 extends from the first side portion 102 and intersects with the bore 100 intermediate the first side portion 102 and the second side portion 106. The inside portion 60 and the outside portion 62 are fixedly attached in a convention manner by a plurality of fasteners 122. Extending radially outward and attached to the first side portion 102 of the outside portion 62 is a driving disk 124 which makes up a portion of the drive wheel 28. In this application, the driving disks 96,124 are removably attached to the outside portion 62 and the inside portion 60 by a plurality of fasteners 125 in a conventional manner. The driving disks 96,124 each include a driving portion 126 being separated by a preestablished space or cavity 127. In this application, although not a necessity, an elastomeric material 128 is fixedly attached to the driving portion 126 of each of the driving disks 96, 124. The cavity 127 is further defined between each of the driving disks 96,124 and is generally centered about the center portion 64 of the hub assembly 56 and the axis 19.

The center portion 64 has a generally cylindrical configuration being defined by a cylindrical outer surface 130 extending between a pair of ends 132. The cylindrical outer surface 130 has a preestablished diameter and a preestablished length extending between the pair of ends 132. An inner surface 134 has a generally stepped contour being defined by a sealing surface 136 extending inwardly from each of the pair of ends 132, a bearing surface 138 extends axially inwardly from each of the sealing surfaces 136 and an abutting surface 140 extends radially inwardly from the bearing surfaces 138 to intersect with an axial inner surface 142 extending between each of the abutting surfaces 140.

An inner race 150 of a pair of bearings 152 is positioned about the bearing surface 138 of the outside portion 62 and abuts with the second abutting surface 108 of the outside portion 62. The other inner race 150 of the pair of bearings 152 is positioned about the bearing surface 138 of the outside portion 62 and abuts with the abutting surface 80 defined on the first protrusion 78 on the inside portion 60. An outer race 154 of the pair of bearings 152 is positioned in functional relationship with the respective inner race 150 of the pair of bearings 152 and the respective bearing surface 138 and abutting surfaces 140 of the center portion 64.

Positioned about the outer surface 130 of the center portion 64 is a cushioning member 160 which in this application is made of an elastomeric material, such as rubber. And, a support assembly 162 has a first end 164 attached to the outer extremity of the cushioning member 160. And, a second end 166 of the support assembly 162 is attached to the roller frame assembly 44 in a conventional manner. Extending between the first end 164 and the second end 166 of the support assembly 162 is a structural member 168 having a preestablished width and a preestablished height to define a preestablished section modulus. The preestablished width of the structural member 168 is less than the preestablished space 126 formed and separating the driving disk 70 and the driving disk 124.

Thus, a system 170 for attaching an endless belt 14 to a work vehicle 10 and for supporting the roller frame assembly 44, in addition to the conventional portion being attached to the hard bar 46 at or near the first end 50 of the roller frame 44, includes the cushioning member 140 attached to the outer surface 130 of the center portion 64 and being positioned within the first end 164 of the support assembly 162. And, the structural member 168 interposed the first end 164 and the second end 166. Additionally, the system 170 includes the drive wheel 28 and the hub assembly 56.

The hub assembly 56 is drivingly connected to the axle 48 by a conventional fastening system 180. In this application, the fastening system 180 includes a plurality of wedge members 182 having a arcuate inner surface 184 frictionally interfacing with the axle 48 and having a frustoconical outer surface 186 frictionally interfacing with the frustoconical bore 120 of the outside portion 62. The plurality of wedge members 182 are attached to the outside portion 62 by a plurality of conventional fastener 188, which in this application includes a plurality of bolts 190 extending through a plurality of holes 192 in the plurality of wedge members 182 and being threadedly attached to a plurality of threaded holes 194 in the outside portion 62.

INDUSTRIAL APPLICABILITY

With the present configuration, the extremities or edges of the drive wheel 28 and the endless belt 14 are unobstructed and the debris is easily removed from the interface of the drive wheel 28 and the endless belt 14. Furthermore, the first end 164 of the support assembly 162 is attached to the center portion 64 of the multipiece hub assembly 56 and has the cushioning member 160 therebetween allowing the system 170 to movably, rotatably and cushionably connect the roller frame assembly 44 to the axle 48.

The system 170 is assembled as follows. The multipiece hub assembly 56 is subassembled. Prior to starting the subassembly, the outer surface 130 of the center portion 64 has the cushioning member 160 assembled thereto in a conventional manner. The center portion 64 has one of the outer races 154 of the pair of bearings 152 positioned in abutting relationship to the abutting surface 140 and in working relationship to the bearing surface 138. One of the inner races 150 of the pair of bearings 152 is positioned in working relationship with the outer race 154. And, a portion of the seal member 116 is positioned in sealing relationship to the corresponding sealing surface 136. Additionally, the outer race 154 of another of the pair of bearings 152 is positioned in abutting relationship to the other abutting surface 140 of the inner surface 134 of the center portion 64 and another of the inner races 150 of another of the pair of bearings 150 is positioned in working relationship the outer race 154. And, a portion of another of the seal members 116 is positioned in sealing relationship to the corresponding sealing surface 136.

The outside portion 62 has the remainder of the portion of the seal member 116 positioned in sealing relationship to the sealing surface 114 on the outside portion 62. And, the inside portion 60 has the remainder of the portion of the another of the sealing members 116 positioned in sealing relationship to the sealing surface 92 of the inside portion 60.

One of the outside portion 62 or the center portion 64 is moved into assembled position with the portions of the seal members 116 being sealingly engaged and the inner races 150 of each of the pair of bearings 152 being slidably positioned on the bearing surface 118. Prior to assembling the inside portion 60, the first end 164 of the support assembly 162 is positioned about the outer extremity of the cushioning member 160. And, the inside portion 60 is assembled so that the portions of the another sealing members 116 are in sealing engagement, the abutting surface 80 of the first protrusion 78 being in contacting relationship with the inner race 150 of the another one of the pair of bearings 152, and the abutting surface 76 of the second side portion 74 being in contacting relationship with the first abutting surface 108 of the second side portion 106 of the outside portion 62. The inside portion 60, outside portion 62 and the center portion 64 are maintained in contacting relationship and rotational relationship by the plurality of fasteners 122.

The pair of driving disks 124 are removably attached to the respective inside portion 60 and outside portion 62 by the plurality of fasteners 125 prior to being positioned about the axle 48. With the hub assembly 56 positioned about the axle 48 and being axially spaced apart forming the predetermined gage of the work machine 10, the plurality of wedge members 182 are interposed the hub assembly 56 and the axle 48. The plurality of bolts 190 are positioned in the corresponding one of the plurality of holes 192 and individual ones of the plurality of wedge members 182 or aligned to engage the plurality of bolts 190 with the corresponding one of the plurality of threaded holes 194 in the outside portion 62. As the plurality of bolts 190 are threadedly engages with the plurality of threaded holes 194 the frustoconical outer surface 186 of the plurality of wedge members 182 are frictionally interfaced with the frustoconical bore 120 of the outside portion 62 of the hub assembly 56. Thus, the hub assembly 56 is drivingly connected to the axle 48 at a preestablished location defining the preestablished gage of the work machine 10.

With the hub assembly 56 positioned rotatably about the axle 48 the second end 166 of the support assembly 162 is attached to the roller frame assembly 44. In the assembled condition, the hub assembly 56 is supported by the support assembly 162 being attached in cushioned relationship between the pair of driving disks 124. Thus, with the hub assembly 56 supported generally about the center thereof debris which is extruded toward the sides 18 of the belt 14 by the interface of the drive wheel 28 and the belt 14 fails to accumulate, catch and buildup on the supporting structures.

Additional benefits of the hub assembly 56 being supported generally about the center is that the roller frame 44, support system 170, and the endless belt 14 is a stand alone unit and the assembly can be detached from the chassis 20 with the endless belt 14 being tensioned by the tensioning system 40. This makes gage changes simpler, easier and more efficient. Furthermore, with the support system 170 including the cushioning member 160 positioned about the center portion 64 of the hub assembly 56 and within the first end 164 of the support assembly 162 a variation or misalignment of the roller frame 44 to the pair of bearings 152 allowing for less than a prefect gage adjustment or alignment.

Other aspects, objects and advantages of this invention can be obtained from a study of the drawings, the disclosure and the appended claims.

I claim:

1. A work machine comprising:
  a chassis;
  an engine having a transmission and a final drive operatively connected and attached to the chassis;
  a pair of endless belts positioned on each of a side of said work machine and being operatively driven by said engine, transmission and final drive, said pair of endless belts defining an inner surface and a pair of sides;
  a pair of drive wheels being drivingly and axially movably attached to said final drive on each of said sides of the work vehicle, each of said drive wheels having a rotatable hub assembly defining a pair of driving disks being spaced apart forming a cavity therebetween; and
  a pair of support assemblies each having a first end being attached to the corresponding hub assembly and having a cushioning member interposed said first end and said corresponding hub assembly, and a second end being attached to the chassis, said first end of the support assembly being positioned between the pair of sides of individual ones of the pair of endless belts.

2. The work machine of claim 1 wherein said pair of drive wheels axial movement define a gage of the work machine.

3. The work machine of claim 1 wherein said chassis of said work machine includes a hard bar being movably and rigidly attached to the roller frame assembly.

4. The work machine of claim 3 wherein said second end of the support assembly is attached to the hard bar.

5. The work machine of claim 4 wherein said second end of the support assembly is rigidly attached to the hard bar.

6. The work machine of claim 4 wherein each of said pair of endless belts define a guiding portion extending from said inner surface centrally positioned between said pair of sides and being positioned between the pair of driving disks.

7. The work machine of claim 1 wherein each of said driving disks includes a driving portion.

8. The work machine of claim 7 wherein said driving portion has a elastomeric material attached thereto.

9. The work machine of claim 1 wherein said chassis has a roller frame assembly attached thereto on each of said side of said work vehicle having an idler wheel attached thereto, said idler wheel and said respective one of said pair of drive wheels being spaced apart by a tensioning system.

10. The work machine of claim 1 wherein said support assembly is positioned generally centered between the pair of driving disks.

11. The work machine of claim 1, wherein said cavity being generally centered about said hub assembly.

12. A system for attaching an endless belt to a work vehicle, said endless belt includes a pair of sides and an inner surface being defined between said pair of sides and said work vehicle includes a chassis and a driving apparatus operatively attached to said chassis, said system comprising:

a rotatable hub assembly having a driving disk operatively attached to the driving apparatus and being spaced from the chassis, said driving disk including a pair of driving portions being separated by a preestablished space;

a support assembly having a first end being attached to the hub assembly and having a cushioning member interposed said first end and said corresponding hub assembly, and a second end being attached to the chassis, said first end of the support assembly being positioned within the preestablished space and within the pair of sides of the endless belt.

13. The system of claim 12 wherein said pair of sides of said endless belt defines an axis therebetween being generally centered therebetween and said support assembly is generally centered on said axis.

14. The system of claim 12 wherein said driving portion has an elastomeric material attached thereto.

15. The system of claim 12 wherein said system further includes a roller frame having an idler wheel attached thereto.

16. The system of claim 15 wherein said system further includes a tensioning system operative attached to the idler wheel.

* * * * *